April 10, 1928.  
M. KOEHLER  
1,665,964  
LUBRICATING SYSTEM  
Filed Dec. 1, 1925

Inventor,
Marcel Koehler

April 10, 1928.
M. KOEHLER
1,665,964
LUBRICATING SYSTEM
Filed Dec. 1, 1925
2 Sheets-Sheet 2
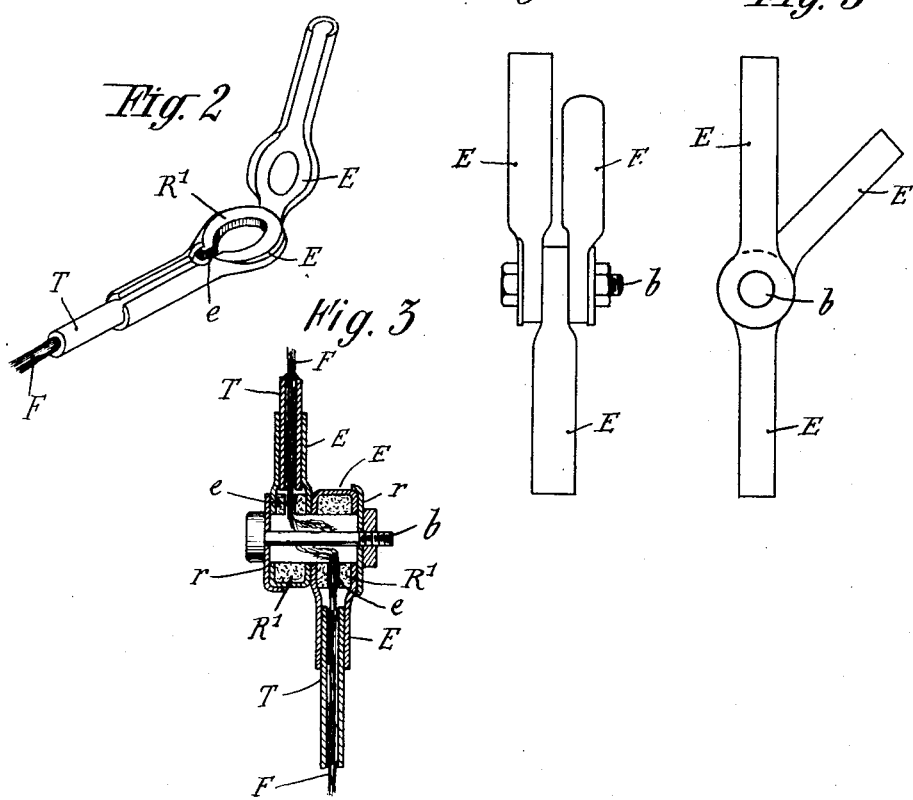

Patented Apr. 10, 1928.

1,665,964

UNITED STATES PATENT OFFICE.

MARCEL KOEHLER, OF PARIS, FRANCE.

LUBRICATING SYSTEM.

Application filed December 1, 1925, Serial No. 72,504, and in France October 7, 1925.

The present invention has for its object a system of lubrication which permits of effecting the lubrication at a distance of all mechanical elements pertaining to an apparatus such as a motor vehicle, aeroplane, or a stationary machine or the like by means of a single reservoir or of a limited number of reservoirs whose inspection and maintenance can be readily effected. The presence of oil in the said reservoir or reservoirs will suffice to assure the necessary lubrication of the parts at the several points in question and without excess, according to needs, irrespectively of the relative positions of the said parts and the reservoir.

My said system of lubrication is based upon the use of capillary action and of the surface tension of liquids, and in particular of the animal vegetable or mineral oils contained in capillary ducts or interstices of great length which connect the reservoir or reservoirs with the several elements to be lubricated, the said capillary ducts or interstices may be of a natural or an artificial origin.

When they are of a natural origin, they consist of flexible vegetable elements such as rattan or other elements, whose ducts when freed from their sap by washing or by like means, will constitute a set of capillary tubes of an approved nature, and whereof of fluid-tightness may be assured by the application of a suitable coating.

When the said ducts or interstices are of an artificial origin, they may consist of a set of threads or wires, or of a filling of any suitable nature, either metallic, vegetable or animal, placed within a tube of suitable diameter or a tight casing of any kind which will protect the filling from all external contact; the tube or casing which may be metallic or of any other rigid material will thus form a wall which is fluidtight and which is unaffected by the oils circulating therein.

By way of indication, I may employ a tube which consists of a hollow cylindrical sheath of cotton which is varnished on the outside with boiled linseed oil, such sheath being in general use at the present time in the electrical industries by reason of its approved resistance to the action of petroleum oil.

The set of threads or capillary filling may consist of any suitable fibres whether animal, vegetable or metallic, and by way of example, of cotton threads, hemp cord with several strands, flax, sisal hemp, and in general of all spun vegetable fibres, or otherwise of sets of fine wires either twisted or not.

The invention will be understood from the following description with reference to the appended drawings which are given by way of example and which represent diagrammatically, in Fig. 1, the application of the system to the lubrication of one of the elements of a motor vehicle.

Fig. 2 shows in perspective the end of a portion of tube which may be readily connected.

Figs. 3, 4 and 5 show respectively a section, a front view and a side view of various tube portions assembled.

Figure 1:
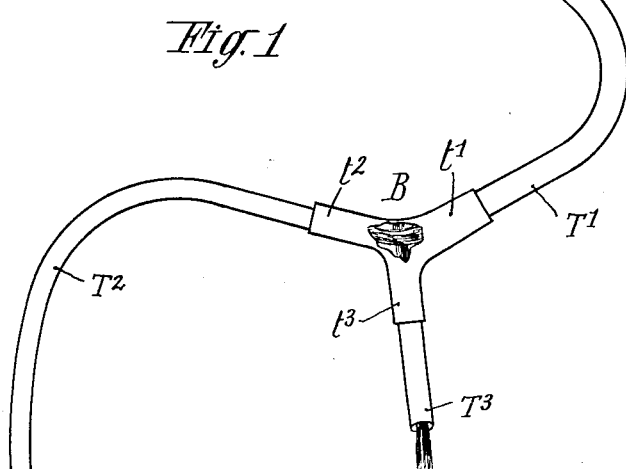
Figure 1:
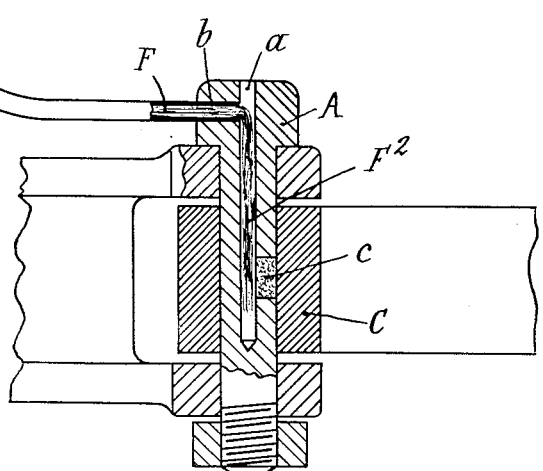

The system of lubrication shown in Fig. 1 comprises a tank R containing oil; said tank which is located above the parts to be lubricated may be of the constant level type with float feed, and may if necessary be supplied by another tank of larger size. One or more tubes $T^1$ lead from the said tank, each tube containing a set of small tubes representing capillary ducts F.

To supply the several points to be lubricated, suitable branches or offtakes are provided, that is to say the pipe is divided into two or more pipes, and at these branch points, the capillary elements being placed in contact, for instance by a simple splice to assure the transmission of the oil into the interior of the tight junction box.

The junction box can be constructed as shown in the drawings at B. The said box consists of a main part carrying three conduits $t^1$ $t^2$ $t^3$, or a greater number, into which the tubes $T^1$ $T^2$ $T^3$ of the feeding circuit are inserted by friction, or to which they are secured by upsetting, cementing or in any other suitable manner. A cover of adequate form, not shown, closes the aperture of the box; after connecting the capillary parts together, a coat of varnish is given to the whole in order to make it fluidtight.

The said junction boxes may be constructed in any suitable manner, either by moulding or by stamping, and they may consist of any suitable material, and chiefly of varnished cotton fabric as for the covering tubes $T^1$ $T^2$ themselves.

The junction may also be carried out by the use of distinct metal pieces which can be assembled when the device is put together, each part being permanently secured to the end of the said outer tube.

Each part can be united with one or more like parts, according to needs, the number being as desired, so as to form as many branches on the main piping as are found necessary.

A unit device consists for instance of an annular member E made in two parts united by the upsetting process and comprising a tubular extension; the said piece, which is surrounded by a washer R¹ having therein a notch a for the insertion of the capillary element F, is secured to a tube or sheath T and is given a coat of varnish which makes the device fluidtight. The washer r placed in the interior serves for the centering of the device and chiefly for the centering of the bolt b whose diameter is much less than the diameter of the aperture of the washer R¹; whereby the said capillary element may pass around the said bolt and may be connected with the adjacent element.

Each capillary element may thus be subdivided, by means of one or more of the aforesaid junction boxes, into any desired number of elements, which are contained in the said tubes and serve for the supply of the several points to be lubricated; the direction of the offtakes of the tubular elements, the branches from the said casings, the number of the said tubes, and the size of the same, being determined in each particular case according to the requisite lubrication. At the points to be lubricated, the capillary elements are placed in contact with the parts to be lubricated, either directly or by means of a feed member, or by like means.

In the case of motor vehicles, the set of capillary tubes may lead to each part to be lubricated, such as the axles for the springs, the steering pivots, the wheel spindles, the axles of the coupling bars or the steering links, or the like, which are usually lubricated by thick grease supplied at intervals by a pump. In this manner the oil tank will supply a tube containing capillary elements, which is subdivided into as many tubes as there are mechanical parts to be lubricated.

In Fig. 1, the tube T² leading from the junction box B ends at the spring axle A which is pierced in the usual manner with the duct a. The tube T² leads in the lateral direction to the head of the axle of the spring through a lateral aperture b, and the capillary element, which constitutes a sort of wick, extends at F² through the duct a. Adjacent the aperture C of spring A is pierced an aperture c for the insertion of a felt member which serves to bring the oil into contact with the aperture C whereby the friction surfaces may be lubricated.

Obviously, my said lubricating arrangement may be employed upon aeroplanes or other apparatus for the lubrication of parts which are difficult of access, such as the supporting pulleys for the wing flaps and the rudder. The arrangement is also applicable to the lubrication of railway vehicles.

My said system can further be utilized to compensate for the losses of oil from recipients forming reservoirs in which the parts are lubricated by immersion or by direct contact, such as the change-speed box or the rear axle device. If necessary, the tank itself will consist of one of the said recipients or by a compartment formed therein.

In a more general manner, my said system may be employed for the circulation of all suitable liquids which are supplied from a given point and are discharged at various other points, in all cases in which a slow circulation may be effected.

What I claim is:—

1. A system of lubrication for the operative parts of apparatus, comprising an elevated tank for liquid lubricant, flexible elements forming capillary ducts between the tank and the parts to be lubricated, and a flexible coating upon said elements whereby fluid-tight conditions are obtained.

2. A system for lubrication for the operative parts of apparatus, comprising an elevated tank for liquid lubricant, flexible capillary ducts between the tank and the parts to be lubricated, flexible sheaths surrounding the said sets of capillary elements, junction boxes at the ends of each of the capillary elements, and conduits on said junction boxes to receive the said sets of capillary ducts.

3. A system of lubrication for the operative parts of apparatus, comprising an elevated tank containing the lubricant, flexible capillary ducts between the tank and the parts to be lubricated, flexible sheaths surrounding the ducts, eye-shaped connecting devices for said capillary elements to receive the capillary elements, and assembling axles adapted to be engaged in the said eyes.

In testimony that I claim the foregoing as my invention, I have signed my name hereto.

MARCEL KOEHLER.